United States Patent [19]

Ziegler

[11] Patent Number: 4,660,875

[45] Date of Patent: Apr. 28, 1987

[54] HOOK CONSTRUCTION

[75] Inventor: Ferdinand Ziegler, Attleboro, Mass.

[73] Assignee: Azon Corporation, North Attleboro, Mass.

[21] Appl. No.: 840,965

[22] Filed: Mar. 14, 1986

[51] Int. Cl.$^4$ ............................................... B65G 7/12
[52] U.S. Cl. ........................................................ 294/26
[58] Field of Search .................... 294/15, 18, 25, 26, 294/131; 224/267, 268

[56] References Cited

U.S. PATENT DOCUMENTS

| D. 255,317 | 6/1980 | Slinkard | 294/26 X |
|---|---|---|---|
| 513,875 | 1/1894 | Burriss | 294/25 X |
| 673,830 | 5/1901 | Wade | 294/26 |
| 922,136 | 5/1909 | Groves | 294/26 |
| 929,173 | 7/1909 | Stone | 294/26 X |
| 1,086,636 | 2/1914 | Anderson | 294/26 |
| 2,278,610 | 4/1942 | Brownson et al. | 294/25 |
| 2,628,857 | 2/1953 | Nelson | 294/26 |
| 2,757,952 | 8/1956 | Samuelson | 294/26 |
| 3,310,331 | 3/1967 | Michaud | 294/26 |

Primary Examiner—Johnny D. Cherry
Attorney, Agent, or Firm—Salter & Michaelson

[57] ABSTRACT

A hook construction comprises a frame having a front wall and a pair of spaced side walls which extend rearwardly from the front wall, a handle which extends between the side walls in rearwardly spaced relation to the front wall, a hook element which extends forwardly from the front wall, and a strap which extends between the side walls in rearwardly spaced relation to the handle. For use of the hook, the handle is grasped in a hand of an operator, and the strap is positioned so that it is engageable with the rear side of the adjacent wrist of the operator to prevent the hook from pivoting rearwardly in the hand. The hook can be effectively utilized for grasping, moving and and holding articles such as large pieces of meat without causing irritation to the hand in which it is held and without causing excessive wear to a glove on the hand.

3 Claims, 4 Drawing Figures

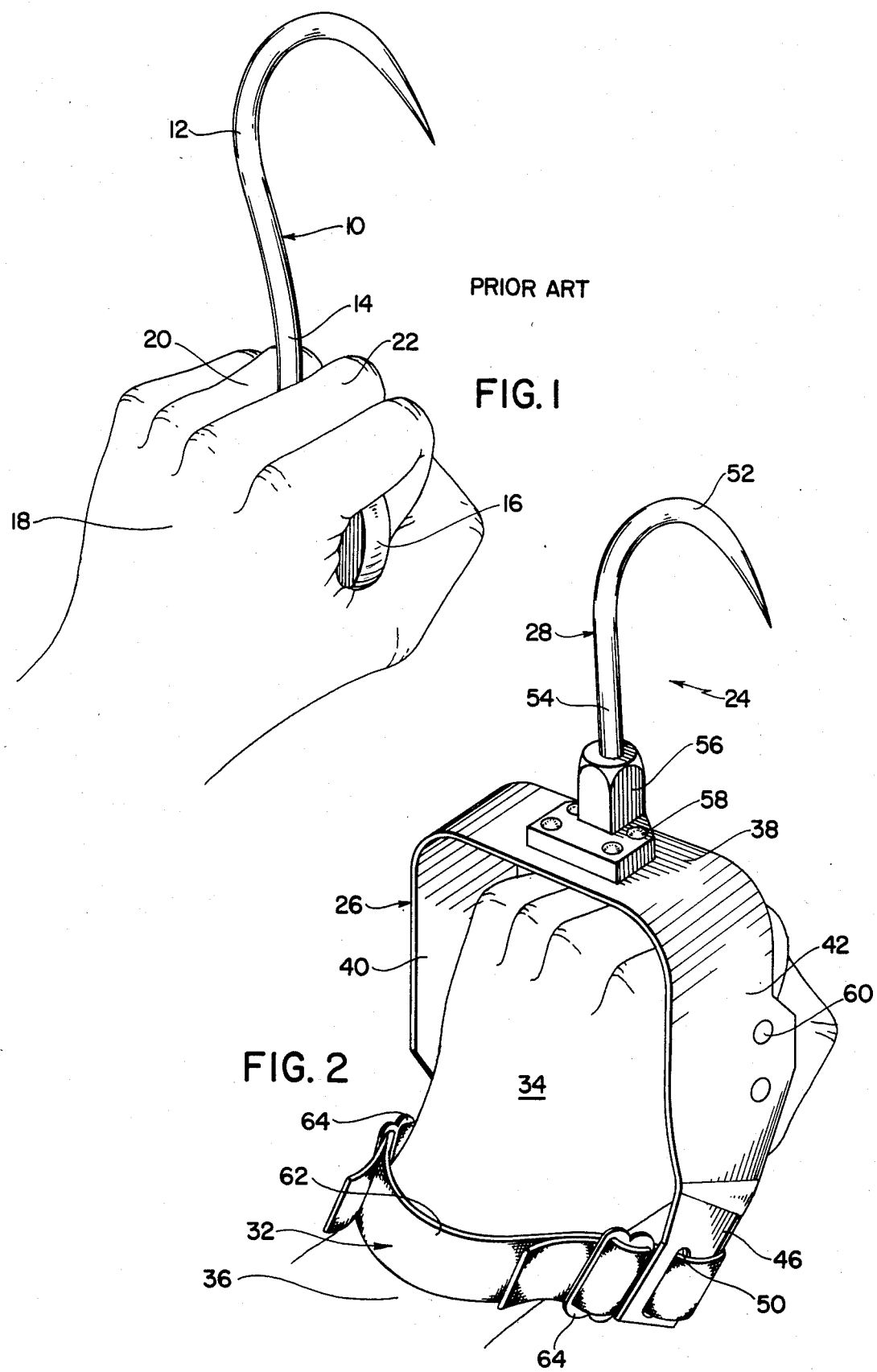

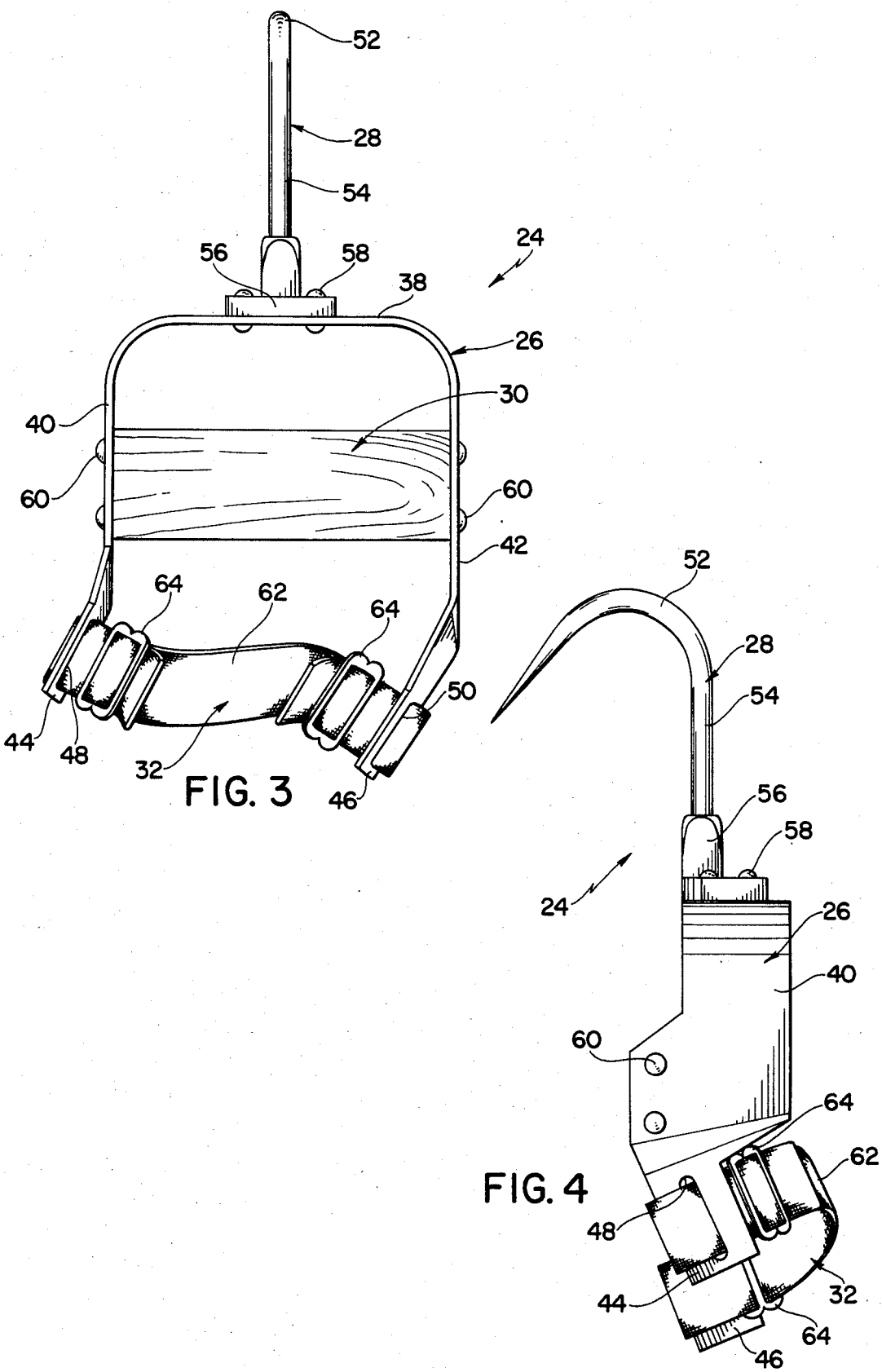

HOOK CONSTRUCTION

BACKGROUND AND SUMMARY OF THE INVENTION

The instant invention relates to hooks of the type which are utilized for moving and handling large articles and more particularly to a hook construction which is adapted to be held in the hand and utilized for handling and moving articles such as large pieces of meat to facilitate the handling, moving, processing, etc., thereof.

Meat hooks are widely used by butchers, meat cutters, and meat packers for handling and moving large pieces of meat during meat processing operations. In this regard, it has been found that a meat hook can be utilized as a convenient tool for enabling a person to securely hold a large piece of meat with one hand while performing various cutting operations thereon with a knife held in the other hand. The most common type of heretofore available meat hook comprises a hook-shaped element and a handle which is secured to the stem portion of the hook element in substantially transverse relation thereto. A meat hook of this type is utilized by grasping the handle thereof in the hand so that it is encircled by the fingers and so that the stem portion of the hook element is interposed between the two middle fingers of the hand and projects forwardly therefrom. When a conventional meat hook is held in this manner, the area of the hand which extends between the two fingers prevents the meat hook from pivoting rearwardly in the hand during use of the meat hook. Accordingly, a meat hook of this type can be utilized for piercing a large piece of meat with the hook element to effectively hold the piece of meat during a meat processing operation. Unfortunately, however, it has been found that a meat hook of this general type has several disadvantages. Specifically, it has been found that the hook element of a meat hook of this type can cause irritation to the inner sides of the middle fingers of a hand where it passes therebetween. It has been further found that when gloves are worn by a person utilizing a meat hook of this type, the hook element can cause excessive wear to the glove on the hand in which the meat hook is held in the areas where the hook element passes between the fingers.

Devices representing the closest prior art to the instant invention of which the applicant is aware as disclosed in the U.S. patents to SCOTT No. 309,408; SMITH No. 1,243,565; COTE No. 1,465,510; YODER No. 2,575,986; JOHNSON No. 2,623,772; MICHAUD No. 3,310,331; LINDBERGH No. 4,061,387; JACKSON No. 4,364,592; and WYATT No. 4,463,977. However, since they fail to suggest a hook construction of the type hereinafter set forth comprising a frame, a hook element attached to the frame, a handle attached to the frame and a strap which is engageable with the adjacent wrist of an operator when the operator is grasping the handle, they are believed to be of only general interest with respect to the instant invention.

The instant invention provides an effective hook construction which can be utilized by workers while handling and/or processing meats and other articles and which overcomes the disadvantages of the heretofore available meat hooks. More specifically, the hook construction of the instant invention can be utilized by workers handling and/or processing meats without causing irritation to the middle fingers on the hand in which the hook is held and/or without causing excessive wear to a glove worn on the same hand. In particular, the hook construction of the instant invention comprises a frame having a front wall and a pair of spaced, rearwardly extending side walls, hook means attached to the frame and extending forwardly from the front wall thereof, handle means attached to the frame and extending between the side walls, and flexible strap means attached to the frame and engageable with an operator for preventing rearward rotation of the hook construction in the hand of the operator when the operator is grasping the handle means. The side walls preferably extend rearwardly beyond the handle means, and the strap means, which preferably comprises a flexible strap, is preferably attached to the side walls in rearwardly spaced relation to the handle means so that it extends between the two side walls. Further, the strap is preferably positioned for engagment with the back side of the wrist of an operator, and it is preferably adjustable in length. Accordingly, for use of the hook construction, the handle means is grasped by the hand of an operator so that the hook means extends forwardly from the hand and so that the strap engages the back side of the wrist of the operator. Thereafter, when the hook construction is manipulated by the operator so that a force is applied to the hook means which tends to cause the hook construction to be pivoted rearwardly in the operator's hand, the strap provides support for the hand which substantially prevents rearward rotation of the hook construction in the hand.

Accordingly, it is a primary object of the instant invention to provide an effective hand-held hook construction which is operable without causing irritation to the hand of an operator and/or excessive wear to a glove worn on the hand.

Another object of the instant invention is to provide an effective hook construction having a hook element which does not pass between adjacent fingers on the hand of an operator during use of the hook construction.

A still further object of the instant invention is to provide an effective hook construction comprising a strap for preventing the hook construction from being pivoted rearwardly in the hand of an operator.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of a hook of the prior art held in a hand of an operator;

FIG. 2 is a perspective view of the hook construction of the instant invention held in a hand of an operator;

FIG. 3 is a top plan view of the hook construction of the instant invention;

FIG. 4 is a side elevational view thereof.

DESCRIPTION OF THE INVENTION

Referring now to the drawings, a hook of the prior art is illustrated in FIG. 1 and generally indicated at 10, and it comprises a hook element 12 having a shank portion 14 and a handle element 16 which is attached to the shank portion 14 in substantially transverse relation thereto. The hook 10 is operable by an operator by grasping the handle element 16 with a hand 18 so that the shank portion 14 passes between the two middle fingers 20 and 22 on the hand 18 and so that the hook element 12 projects beyond the fingers 20 and 22 to enable the hook element 12 to be utilized for penetrating and grasping various articles, such as large pieces of meat. However, because the shank portion 14 passes between the fingers 20 and 22, it can cause irritation to the adjacent portions of the hand 18, and in particular fingers 20 and 22, when the hook 10 is utilized for extended periods of time. Further, when a glove is worn on the hand 18, the shank portion 14 can cause extensive wear to the glove along the areas thereof where the glove engages the shank portion 14.

Referring now to FIGS. 2 through 4, the hook construction of the instant invention is illustrated and generally indicated at 24. The hook construction 24 comprises a frame generally indicated at 26, a hook element generally indicated at 28 which is attached to the frame so that it extends forwardly therefrom, a handle element generally indicated at 30 which is attached to the frame 26, and a strap generally indicated at 32 which is also attached to the frame 26. As illustrated in FIG. 2, the hook construction 24 is operable by grasping the handle element 30 in a hand 34 of an operator so that the strap 32 engages the adjacent wrist 36 of the operator to prevent the hook 24 from rotating rearwardly in the hand 34. In this connection, the hook constructio 24 as herein set forth is adapted for use in the left hand of an operator, and therefore the hand 34 is herein illustrated as a left hand. It will be understood, however, that other embodiments of the hook construction of the instant invention which are adapted for use in the right hands of operators are also contemplated.

The frame 26 is preferably made from a suitable rigid, lightweight, and corrosion-resistant metal, such as aluminum, and it preferably comprises a front portion or wall 38 and a pair of spaced side walls 40 and 42 which extend rearwardly from opposite ends of the front wall 38. The side walls 40 and 42 include rear tabs 44 and 46, respectively, which are angled to one side of the frame 26, as illustrated most clearly in FIG. 3. In this connection, since the hook construction 24 is adapted for use in the left hand, the tabs 44 and 46 are angled to the left side of the frame 26, although, as hereinabove set forth, it will be understood that other embodiments of the hook construction are contemplated which are adapted for use in the right hand, and hence the tabs 44 and 46 could alternatively be angled to the right. In any case, the tabs 44 and 46 are formed with slots 48 and 50, respectively, therein for receiving the strap 32, as will hereinafter be more fully set forth. Further, the frame 26 is dimensioned and configured to receive a hand, such as the hand 34, between the side walls 40 and 42 so that the tabs 44 and 46 are positioned adjacent opposite sides of the base of the hand 34 where it is adjoined to the wrist 36.

The hook element 28 is of conventional construction and preferably made of stainless steel, and it comprises a hook portion 52 having a shank 54, and a base 56 to which the shank 54 is adjoined. The base 56 is assembled on the front wall 38 of the frame 26 and secured thereto with rivets 58 so that the hook portion 52 extends forwardly from the front wall 38.

The handle element 30 is preferably made of a suitable plastic or wood material, and it extends between the side walls 40 and 42. The handle element 30 is secured to the side walls 40 and 42 with rivets 60 so that it is positioned in rearwardly spaced relation to the front wall 38 and so that there is sufficient clearance between the front wall 38 and the handle element 30 to accommodate the fingers on the hand 34. Further, the handle element 30 is preferably positioned so that the tabs 44 and 46 extend rearwardly beyond the ends of the handle element 30, whereby the tabs 44 and 46 are preferably located adjacent opposite sides of the base of the hand 34 where it is adjoined to the wrist 36 when the hand 34 is grasping the handle element 30.

The strap 32 is preferably made of a suitable webbing material, such as nylon, and it comprises a strap element 62 and a pair of buckles 64 which are received on the strap element 62 for adjustably securing the strap element 62 so that it extends between the tabs 44 and 46 and so that it is received in the slots 48 and 50, respectively, therein.

For use and operation of the hook construction 24, the handle element 30 is grasped by a hand 34 in the manner illustrated in FIG. 2, and the strap element 32 is adjusted so that it engages the wrist 36, preferably adjacent the base of the hand 34. Thereafter, the hook element 28 can be effectively utilized for piercing and grasping an article, such as a large piece of meat, in order to more easily move or hold the piece of meat during processing operations, etc. However, when a force is applied to the hook element 28 which would normally tend to cause the hook 24 to be rotated rearwardly in the hand 34, the strap element 32 engages the wrist 36 to reinforce the hand 34 and to thereby prevent the hook 24 from rotating therein. However, the hand 34 can nevertheless be freely pivoted downwardly with respect to the wrist 36, and the hook 10 can be freely released from the hand 34 and the wrist 36. Further, since the hook element 28 extends forwardly from the front wall 30 instead of from the handle element 30, the shank portion 54 does not pass between fingers on the hand 34 so that it does not tend to cause discomfort thereto, and/or so that it does not cause excessive wear to a glove worn on the hand 34. Accordingly, it is seen that the instant invention provides a hook construction which has substantial advantages over the heretofore available hooks, such as the hook 10, and therefore it is seen that the hook construction of the instant invention represents a significant improvement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A hook construction comprising a frame, a hook element attached to said frame and extending forwardly therefrom, a handle element attached to said frame, and strap means attached to said frame, said frame including a front wall and a pair of spaced sidewalls which extend rearwardly from said front wall, said handle element extending between said sidewalls, said strap means extending between said sidewalls in rearwardly spaced relation to said handle element and being positioned and constructed so that when said handle element is grasped in a hand of an operator, said strap means is engageable with the back side of the adjacent wrist for preventing rearward rotation of said handle element in said hand without restricting the downward pivotal movement of said hand with respect to said wrist.

2. In the hook construction of claim 1, said frame sidewalls further characterized as each comprising a front portion and a rear tab portion, said front portion extending rearwardly in substantially parallel spaced relation from said frame front wall, said rear tab portions extending rearwardly and angularly toward one side of said frame in substantially parallel spaced relation, said handle element extending between said sidewall front portions, said strap means extending between said sidewall rear tab portions.

3. In the hook construction of claim 1, said strap means further characterized as being engageable with the back side of said wrist but not encircling said wrist to permit said hook construction to be freely released from said hand and said wrist.

* * * * *